United States Patent
Marco et al.

(10) Patent No.: US 9,597,944 B2
(45) Date of Patent: Mar. 21, 2017

(54) CONTROL OF AN AUTOMOTIVE AIR CONDITIONING SYSTEM WITH AIR REHEATING BASED ON INTERNAL COMBUSTION ENGINE COOLANT FLOW CONTROL

(71) Applicant: C.R.F. Societa' Consortile Per Azioni, Orbassano (IT)

(72) Inventors: Rossella Marco, Orbassano (IT); Walter Ferraris, Orbassano (IT); Carloandrea Malvicino, Orbassano (IT); Carlo D'Ambrosio, Orbassano (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 346 days.

(21) Appl. No.: 14/362,374

(22) PCT Filed: Dec. 5, 2012

(86) PCT No.: PCT/IB2012/056999
§ 371 (c)(1),
(2) Date: Jun. 2, 2014

(87) PCT Pub. No.: WO2013/084168
PCT Pub. Date: Jun. 13, 2013

(65) Prior Publication Data
US 2015/0027152 A1    Jan. 29, 2015

(30) Foreign Application Priority Data
Dec. 5, 2011   (EP) .................................... 11425290

(51) Int. Cl.
*F25B 49/00*    (2006.01)
*B60H 1/00*    (2006.01)
(Continued)

(52) U.S. Cl.
CPC ..... *B60H 1/00735* (2013.01); *B60H 1/00885* (2013.01); *B60H 1/321* (2013.01);
(Continued)

(58) Field of Classification Search
CPC ............ B60H 1/00735; B60H 1/00885; B60H 1/00928
(Continued)

(56) References Cited

U.S. PATENT DOCUMENTS 5,191,768 A    3/1993   Fujii
5,564,625 A *  10/1996  Straub ................ B60H 1/00807
                                                 236/37

(Continued)

FOREIGN PATENT DOCUMENTS

EP           0548677 A2 *  6/1993   ......... B60H 1/00885
EP           1 996 417 B1  7/2009
GB           2 297 634 A    8/1996

*Primary Examiner* — Jianying Atkisson
*Assistant Examiner* — Paul Alvare
(74) *Attorney, Agent, or Firm* — Blank Rome LLP

(57) ABSTRACT

An automotive air conditioning system comprising: an air cooling circuit including a compressor, a condenser, an expansion valve and an evaporator; an air heating circuit, including a flow rate regulation solenoid valve arranged to regulate the flow rate of a heat transfer fluid through the heater; and an electronic control unit. The electronic control unit is configured to receive a measured evaporator air temperature and a set cabin air temperature and to switch the operating condition of the compressor when the measured evaporator air temperature is higher or lower than at least one on/off threshold temperature computed based on the set cabin air temperature.

9 Claims, 5 Drawing Sheets

(51) Int. Cl.
  *F24F 6/00*   (2006.01)
  *F24F 3/14*   (2006.01)
  *F24F 7/00*   (2006.01)
  *F28F 27/00*  (2006.01)
  *B60H 1/32*   (2006.01)
  *F25B 49/02*  (2006.01)

(52) U.S. Cl.
  CPC .. *F25B 49/022* (2013.01); *B60H 2001/00171* (2013.01); *B60H 2001/00928* (2013.01)

(58) Field of Classification Search
  USPC ............... 165/202, 230; 62/126, 228.1, 229; 236/49.3, 37
  See application file for complete search history.

(56) References Cited

U.S. PATENT DOCUMENTS

| | | | |
|---|---|---|---|
| 5,755,282 A * | 5/1998 | Teshima | B60H 1/0005 165/202 |
| 6,352,208 B1 | 3/2002 | Shibata et al. | |
| 2008/0022704 A1 | 1/2008 | Fukuta | |
| 2009/0008467 A1* | 1/2009 | Ise | B60H 1/00735 237/2 A |
| 2009/0217685 A1* | 9/2009 | Mola | B60H 1/3208 62/157 |

* cited by examiner

CONTROL OF AN AUTOMOTIVE AIR CONDITIONING SYSTEM WITH AIR REHEATING BASED ON INTERNAL COMBUSTION ENGINE COOLANT FLOW CONTROL

TECHNICAL FIELD OF INVENTION

The present invention relates to the control of an automotive air conditioning system with air reheating based on internal combustion engine coolant flow control.

STATE OF THE ART

As is known, automotive air conditioning systems can be grouped into two categories, according to the way in which a cold airflow, obtained by cooling an external or recycled airflow, is reheated before being supplied to the cabin of the motor vehicle, exploiting the heat released by a heat transfer fluid constituted by the internal combustion engine coolant.

In air conditioning systems belonging to the first category, which is known as "Air Mixing Reheating", the cold airflow is reheated by totally or partially mixing it, in a mixer equipped with a selector flap that can be operated either manually by a Bowden cable or automatically by an electrical actuator, with a hot airflow from a liquid/air heat exchanger, in which the internal combustion engine coolant is caused to flow.

Instead, in air conditioning systems belonging to the second category, which is known as "Coolant Flow Control Reheating", the cold airflow is reheated directly by means of a liquid/air heat exchanger in which the internal combustion engine coolant is caused to flow, and the flow rate of which is regulated by means of a proportional flow rate regulating solenoid valve.

As the internal combustion engine coolant is caused to flow by a pump driven by the internal combustion engine, in both of the above-mentioned categories of air conditioning systems, the internal combustion engine coolant flow is subject to flow rate variations which are consequent upon engine speed changes, which consequently cause undesired cabin air temperature variations, which are detrimental to the thermal comfort perceived by the occupants.

In the first category of air conditioning systems, the undesired effects of the internal combustion engine coolant flow rate variations on the cabin air temperature are altogether or partly mitigated by automatically controlling the position of the selector flap of the mixer, if it is automatically controlled, while in the second category of air conditioning systems, the undesired effects of the internal combustion engine coolant flow rate variations on the cabin air temperature are altogether or partly mitigated by automatically controlling the flow rate regulation solenoid valve for the internal combustion engine coolant.

However, in this second category of air conditioning systems, effective mitigation of the undesired effects of the internal combustion engine coolant flow rate variations on the cabin air temperature requires the use of flow rate regulation solenoid valves that must be compliant with severe technical specifications, above all in terms of response speed and precision, and that, for this reason, are relatively expensive and therefore significantly impact on the final cost of the air conditioning system and, as a consequence, of the motor vehicle.

For this reason, air conditioning systems in which air reheating is based on internal combustion engine coolant flow control are considerably more expensive than those in which air reheating is based on air mixing and are consequently normally mounted only on high-end motor vehicles, whilst air conditioning systems in which air reheating is based on air mixing are normally mounted on economy to mid-range motor vehicles.

SUBJECT AND ABSTRACT OF THE INVENTION

For various reasons, the Applicant showed the willingness to identify solutions that allow costs to be reduced for automotive air conditioning systems in which air reheating is based on internal combustion engine coolant flow control, so as to result in them being also exploitable on economy to mid-range motor vehicles.

The objective of the present invention is to provide an automotive air conditioning system in which air reheating is based on internal combustion engine coolant flow control and in which manufacturing costs are sufficiently reduced to justify mounting even on economy to mid-range motor vehicles.

According to the present invention, an automotive air conditioning system is provided, as defined in the appended claims.

DETAILED DESCRIPTION OF PREFERRED EMBODIMENTS OF THE INVENTION

Figure 1:
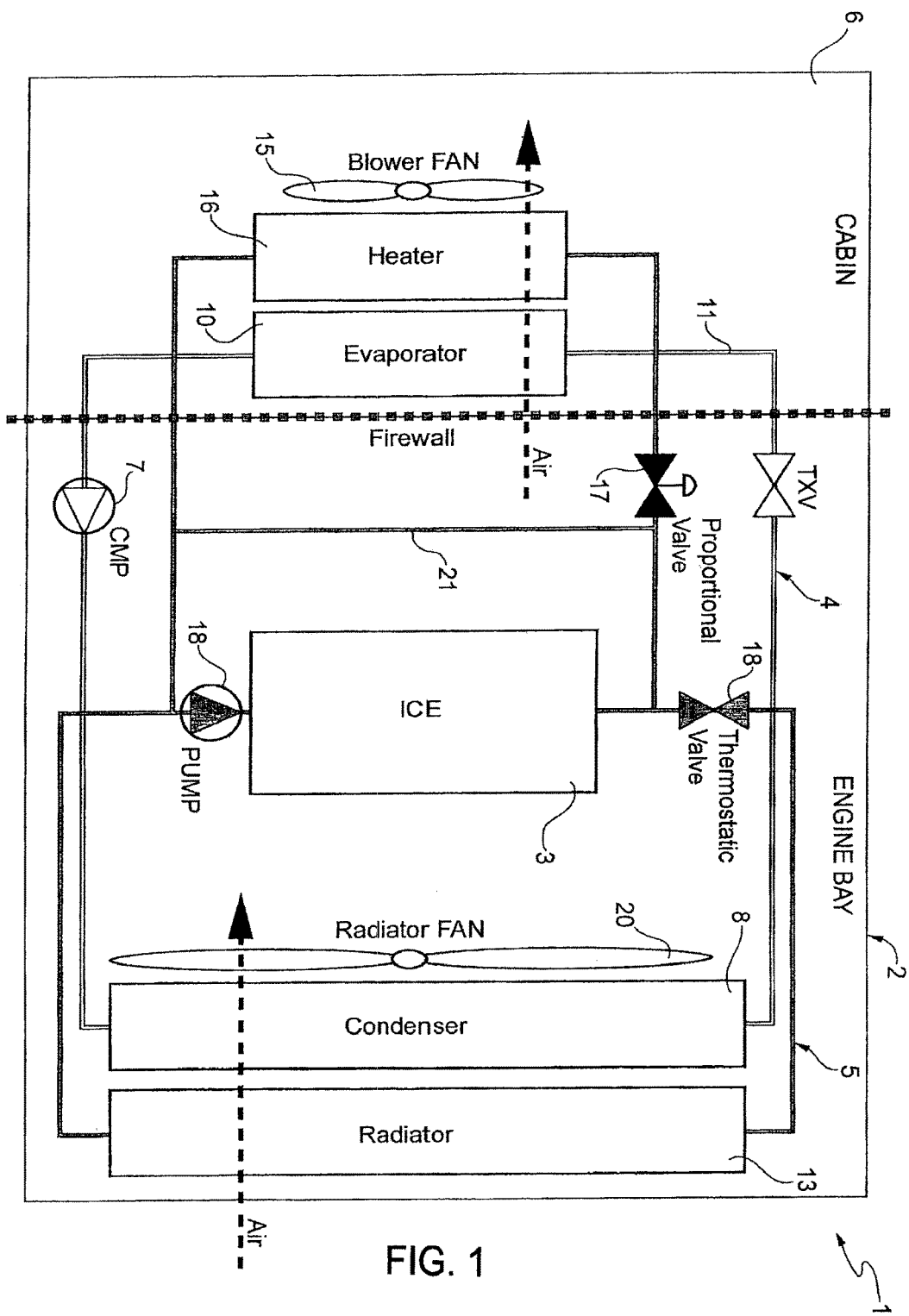
FIG. 1 shows a block diagram of an automotive air conditioning system.

The present invention originates from the idea of checking the possibility of reducing the cost of automotive air conditioning systems in which air reheating is based on internal combustion engine coolant flow control by using flow rate regulating proportional solenoid valves with lower performance, in terms of response speed and precision, and consequently less expensive than those used up until now in the known automotive air conditioning systems.

As it was to be expected, just using lower performance internal combustion engine coolant flow rate regulation solenoid valves obviously resulted in a reduction in mitigating the undesired effects of the internal combustion engine coolant flow rate variations on the cabin air temperature.

However, in-depth research carried out by the Applicant has resulted in discovering and experimentally verifying that the undesired effects of the internal combustion engine coolant flow rate variations on the cabin air temperature can nevertheless be effectively mitigated, or even completely cancelled, by using a technical solution specifically developed and patented by the Applicant for achieving a radically different objective in air conditioning systems belonging to the first category, i.e. air conditioning systems in which the cold airflow is reheated by mixing it with a hot airflow, namely reducing energy consumption of these air conditioning systems and, as a consequence, fuel consumption of motor vehicles equipped with these air conditioning systems.

Therefore, it has been possible to experimentally establish that this technical solution enabled effective compensation of the reduction in mitigating the undesired effects of the internal combustion engine coolant flow rate variations on the cabin air temperature consequent upon adoption of flow rate regulation proportional solenoid valves with lower performance in terms of response speed and precision.

In particular, this technical solution is the subject of the European patent EP-B1-1 996 417 in the name of the Applicant, which is intended to be incorporated herein by reference, and essentially provides for switching the operating state (on/off) of the compressor of the air cooling circuit when the air temperature downstream of the evaporator of the air cooling circuit exhibits a predetermined relation with a threshold temperature that is computed based on the cabin air temperature set by the occupants of the motor vehicle by using the traditional temperature setting devices (knobs and buttons) in the motor vehicle cabin.

In particular, this technical solution contemplates that the compressor is caused to operate in on/off mode and is switched on when the evaporator air temperature rises above the threshold temperature, to avoid condensed water on the surface of the evaporator from freezing and causing the blockage of part of the heat exchange surface, and is switched off when the evaporator air temperature drops below the threshold temperature. The threshold temperature can be just one for both switching on and switching off the compressor or can be differentiated and separated into a compressor switch-on threshold temperature and a switch-off threshold temperature, depending on whether or not it is intended to provide hysteresis between the switching on and switching off of the compressor.

Moreover, unlike the prior art prior to the above-mentioned patent, the threshold temperature is not fixed but depends on the set cabin air temperature according to laws that differ depending on whether the air conditioning system is manually controlled, i.e. equipped with a temperature regulation knob mechanically connected to selector flap of the air mixer by a Bowden cable, or is automatically controlled.

Broadly speaking, in a manually controlled air conditioning system, the threshold temperature is increased, conveniently linearly, as the set cabin air temperature increases within a first range of values corresponding to a cabin air cooling, and then decreased, conveniently linearly, as the set cabin air temperature increases within a second range of values corresponding to an cabin air heating.

Instead, in an automatically controlled air conditioning system, the threshold temperature is varied inversely proportionally to the difference between the outlet air temperature and the set cabin air temperature, such that it increases as the difference decreases.

The present invention will now be described in detail with reference to the attached figures to enable a skilled person to embody it and use it. Various modifications to the described embodiments will be readily appreciated by skilled persons, and the generic principles described herein can be applied to other embodiments and applications without departing from the scope of protection of the present invention, as defined in the appended claims. Therefore, the present invention is not be considered as limited to the embodiments described and illustrated, but be conceded the broadest scope of protection consistent with the principles and characteristics described and claimed herein.

FIG. 1 shows an air conditioning system, referenced as a whole by reference numeral 1, for a motor vehicle 2 (schematically shown), in particular a road motor vehicle equipped with an internal combustion engine 3, and in which air reheating is based on the internal combustion engine coolant flow control.

In particular, air conditioning system 1 essentially comprises an air cooling circuit 4 and an air heating circuit 5 configured to cooperate in conditioning the motor vehicle's cabin air.

Air cooling circuit 4 comprises, in succession, a compressor 7, a condenser 8, an expansion valve 9 and an evaporator 10 connected by a pipe 11 inside which a coolant flows such as ammonia, chloromethane or sulphur dioxide, known halocarbons such as Freon (for example R11, R12, R114 or R134a), or other substances such as carbon dioxide and hydrocarbons such as propane.

Compressor 7 is of an electrically controlled type and can alternatively be of a fixed displacement type or a variable displacement type with internal control and equipped with a clutch; it is arranged in the engine bay 12 and is driven by the internal combustion engine 3 via a belt (not shown). The condenser 8 is also arranged in the engine bay 12, at the front of the motor vehicle 2, close to the radiator 13 of the motor vehicle 2, so as to be impinged by the external air that impinges on the radiator 13 when the motor vehicle 2 is moving. The evaporator 10 is usually arranged in the cabin 6 of the motor vehicle 2, next to the firewall 14 that separates the engine bay 12 from the cabin 6 of the motor vehicle 2.

The task of the compressor 7 is to compress the coolant in a vapour state at the outlet of the evaporator 10, so as to raise temperature and pressure thereof. The coolant from the compressor 7 is then caused to flow through the condenser 8, where it yields heat to the air that flows through it, cooling down and condensing, and consequently passing from the gaseous state to the liquid state. The coolant is then caused to flow through the expansion valve 9, where it is further cooled and partially returns to the vapour phase. At this point, the coolant is caused to flow through the evaporator 10, where it absorbs heat from the air that flows through it, which cools down and is blown into the cabin 6 of the motor vehicle 2 by a blower fan 15 associated with the evaporator 10. In this way, the coolant heats up, passing again to the vapour state, and again being supplied to the compressor 7, in this way recommencing the above-described cycle.

Air heating circuit 5 comprises a heater 16 in the form of a liquid/air heat exchanger, which is arranged inside the cabin 6 of the motor vehicle 2, next to the evaporator 10 of the air cooling circuit 4, and in the example shown is arranged downstream of the evaporator 10 with respect to the direction of the airflow generated by the blower fan 15 associated with the evaporator 10, and is fluidically connected to the internal combustion engine 3, through a proportional flow rate regulating solenoid valve 17, to receive part of the coolant of the internal combustion engine 3, the remaining part of which is caused to flow, through a thermostatic valve, in the radiator 13 of the motor vehicle 2. The coolant of the internal combustion engine 3 is caused to flow in the heater 16 and in the radiator 13 via a pump 19 driven by the internal combustion engine 3 via a belt (not shown). Finally, the radiator 13 is associated with an electrically operable radiator fan 20 to exchange heat between the coolant flowing through the radiator 13 and the external air that impinges on the radiator 13 when the motor vehicle 3 is moving.

The heating circuit further comprises a bypass branch 21 arranged so as to bypass the heater 16 and the flow rate regulation solenoid valve 17 and along which the coolant of the internal combustion engine 3 flows when the flow rate regulation solenoid valve 17 is closed. In this way, when the flow rate regulation solenoid valve 17 is opened, the coolant of the internal combustion engine 3 that consequently starts to flow through the heater 16 is already at a steady temperature, or rather substantially at the same temperature as the internal combustion engine 3, thereby avoiding undesired temperature fluctuations inside the heater 16 and so reducing the response time of the air conditioning system 1.

Figure 2:
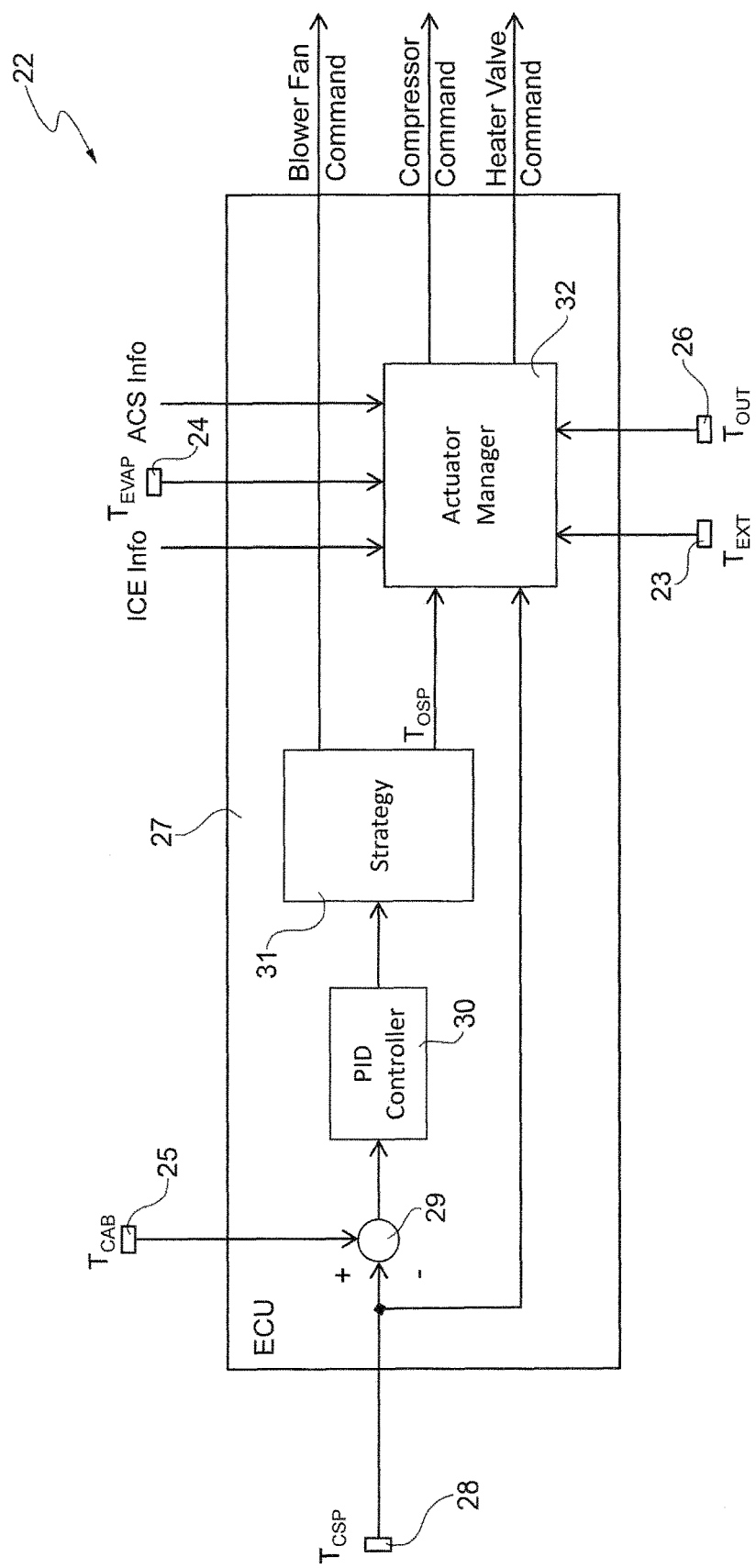
FIG. 2 shows a general functional block diagram of the operations performed by an electronic control unit of the automotive air conditioning system shown in FIG. 1.
Figure 3:
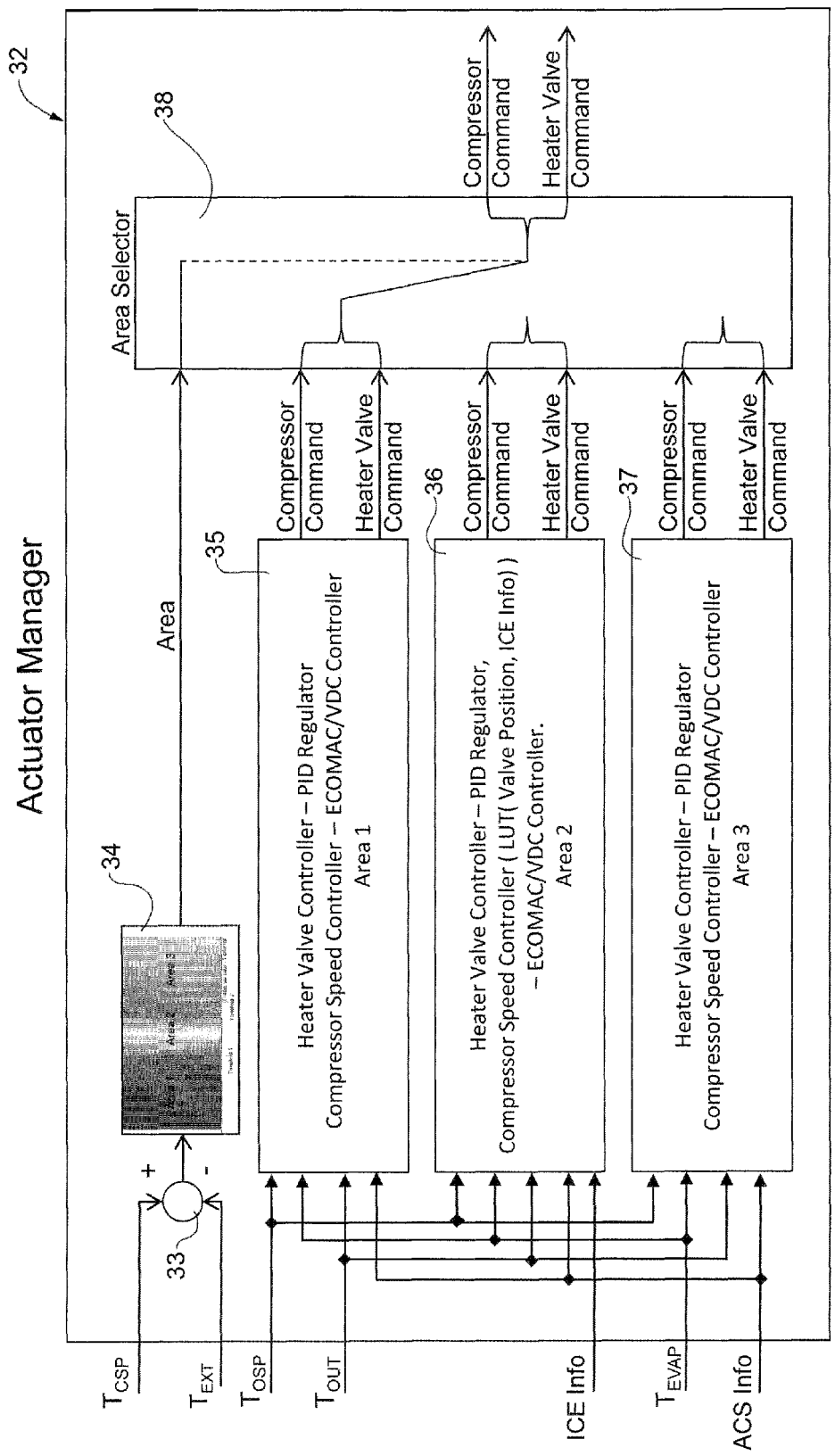
FIGS. 3 and 4 shows detailed functional block diagrams of the operations performed by one of the functional blocks shown in FIG. 2, according to different embodiments.
Figure 4:
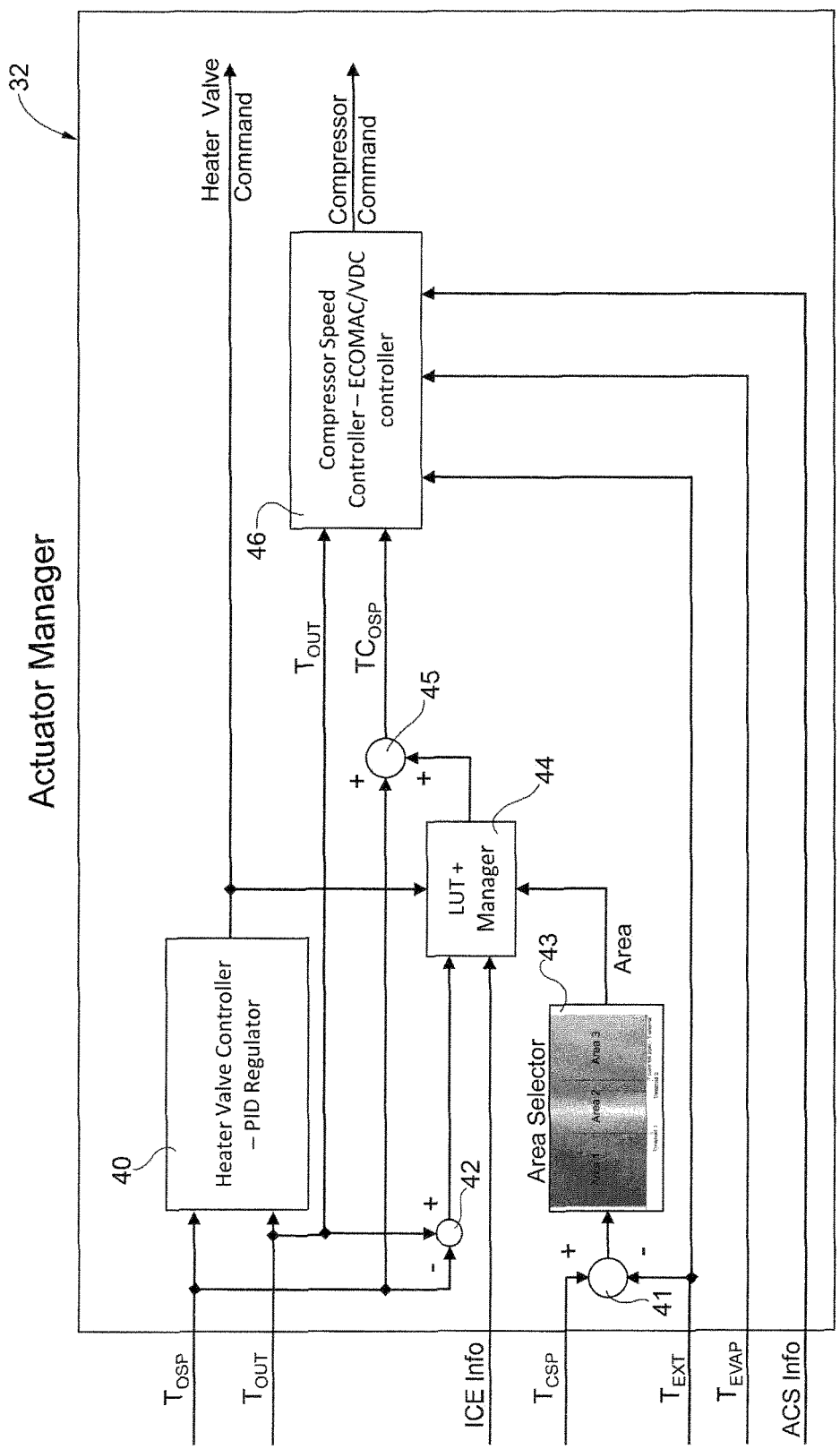

Finally, with reference to FIG. 2, air conditioning system 1 comprises an electronic control system 22 comprising:

- a temperature sensor 23 arranged outside of the motor vehicle 2, for example, on one of the two external rear-view mirrors (not shown) of the motor vehicle 2, to output an electrical signal indicative of a measured external air temperature $T_{EXT}$;
- a temperature sensor 24 arranged downstream of the evaporator 10, with respect to the direction of airflow generated by the associated blower fan 15, to output an electrical signal indicative of a measured evaporator air temperature $T_{EVAP}$;
- a temperature sensor 25 arranged inside the cabin 6 of the motor vehicle 2, for example on the internal rear-view mirror (not shown) of the motor vehicle 2 or under the roof (not shown) of the motor vehicle 2, in a position near to the central courtesy light (not shown), to output an electrical signal indicative of a measured cabin air temperature $T_{CAB}$;
- a temperature sensor 26 arranged inside the cabin 6 of the motor vehicle 2, close to the air outlets (not shown), to output an electrical signal indicative of a measured outlet air temperature $T_{OUT}$; and
- an electronic control unit 27 configured to receive electrical signals from the temperature sensors 21-24 and an electrical signal indicative of a set cabin air temperature $T_{CSP}$, which is set by a user via traditional temperature setting means 28 provided in the cabin 6 of the motor vehicle 2, and programmed to control, among other things, operation of the air conditioning system 1, and in particular the compressor 7 of the air cooling circuit 4, the flow rate regulation solenoid valve 17 and the blower fan 15 associated with the evaporator 10 of the air heating circuit 5, based on the input electrical signals as described, in detail herein below with reference to FIGS. 2, 3 and 4, which show functional block diagrams of the operations carried out by the electronic control unit 27.

In particular, the functional block diagrams shown in FIGS. 2, 3 and 4 are shown purely by way of non-limitative example, and therefore their functional architecture is only to be considered representative of the implemented operations, which are the only ones that represent the characteristics of the present invention. Any other functionally equivalent architecture to those shown in FIGS. 2, 3 and 4 is therefore to be considered an alternative embodiment falling within the scope of protection of the present invention.

In particular, as exemplarily shown in FIG. 2, the electronic control unit 27 is programmed to implement the following functional blocks:

- a subtractor 29 configured to receive the set cabin air temperature $T_{CSP}$ and the measured cabin air temperature $T_{CAB}$ and output a cabin air temperature error based on the difference between the set and measured cabin air temperatures $T_{CSP}$ and $T_{CAB}$;
- a proportional-integral-derivative regulator (PID) 30 configured to receive the cabin air temperature error from the subtractor 29 and output a corresponding control signal;
- a decider 31 configured to receive the control signal from the PID regulator 30 and output an electrical command, conveniently pulse width modulated (PWM), for the blower fan 15 associated with the evaporator 10, and a target outlet air temperature $T_{OSP}$, which are generated in a manner described in greater detail further on; and
- an actuator manager 32 configured to receive the set cabin air temperature $T_{CSP}$, the target outlet air temperature $T_{OSP}$, the measured outlet air temperature $T_{OUT}$, the measured external air temperature $T_{EXT}$ and the measured evaporator air temperature $T_{EVAP}$, as well as quantities indicative of the operational status of the internal combustion engine 3 and of the air conditioning system 1, described in greater detail further on, and output an electrical on/off command signal for the compressor 7 of the air cooling circuit 4 and an electrical regulation command for the flow rate regulation solenoid valve 17 of the air heating circuit 5.

With regard to generation of the electrical command for the blower fan 15 associated with the evaporator 10 and computation of the target outlet air temperature $T_{OSP}$, they are such as to achieve the target cabin air temperature $T_{CSP}$ using, for example, two types of strategy, the first which regulates the target outlet air temperature $T_{CSP}$ after having maximized utilization of the blower fan 15 associated with the evaporator 10, and the second which regulates utilization of the blower fan 15 associated with the evaporator 10 after having maximized the effect of the regulation of the target outlet air temperature $T_{OSP}$. In particular, the electrical command for the blower fan 15 associated with the evaporator 10 is conveniently generated based on a stored look-up table (LUT), which is a database structured so as to associate with each control signal from the PID regulator 30, an electrical command for the blower fan 15 associated with the evaporator 10 that causes optimal airflow inside the cabin 6 to facilitate reaching the target cabin air temperature $T_{CSP}$.

In addition, by way of example, the target outlet air temperature $T_{OSP}$ is conveniently computed based on the external air temperature $T_{EXT}$, the set cabin air temperature $T_{CSP}$ and a stored look-up table (LUT), which is a database structured so as to associate a component of the target outlet air temperature $T_{OSP}$ with each control signal from the PID regulator 30, so as to contribute to reaching the target cabin air temperature $T_{CSP}$.

A functional block diagram of a possible embodiment of the actuator manager 32 is shown in FIG. 3 by way of non-limitative example.

According to what is shown in FIG. 3, the actuator manager 32 comprises the following functional blocks:

- a subtractor 33 configured to receive the set cabin air temperature $T_{CSP}$ and the measured external air temperature $T_{EXT}$, and output an air temperature error based on the difference between the set cabin air temperature $T_{CSP}$ and the measured external air temperature $T_{EXT}$;
- a comparator 34 configured to receive the air temperature error from the subtractor 33 and compare it with two thresholds, respectively lower TH1 and upper TH2 ones, which define three different air temperature error ranges A1, A2 and A3, respectively lower, intermediate and upper ones, to which three different operating conditions of the air conditioning system 1 correspond, which are described in greater detail further on and where the lower air temperature error range A1 is delimited above by the lower threshold TH1, the intermediate air temperature error range A2 is delimited below by the lower threshold TH1 and above by the upper threshold TH2, and the upper air temperature error range A3 is delimited below by the upper threshold TH2. The comparator 34 is further configured to output a selection command indicative of the air temperature error range to which the input air temperature error belongs;

three controllers 35, 36 and 37, each one associated with a corresponding air temperature error ranges A1, A2 or A3, and each formed by a controller stage dedicated to generating the electrical regulation command for the flow rate regulation solenoid valve 17 of the air heating circuit 5 and a controller stage dedicated to generating the electrical on/off command signal for the compressor 7 of the air cooling circuit 4, wherein:

the first controller 35 is configured to receive the target and measured outlet air temperatures $T_{OSP}$ and $T_{OUT}$, the measured evaporator air temperature $T_{EVAP}$, as well as quantities indicative of the operational status of the air conditioning system 1, such as pressure and temperature of the coolant circulating in the air cooling circuit 4, upstream from and downstream of the compressor 7, in order to prevent malfunctions in the air conditioning system 1, and output a pair of electrical commands, one for the flow rate regulation solenoid valve 17 and the other for the compressor 7, which are such as to cause the air conditioning system 1 to operate in an operating condition corresponding to the aforesaid lower temperature error range A1, where the electrical regulation command for the flow rate regulation solenoid valve 17 is such as to cause the complete closing of the flow rate regulation solenoid valve 17 and is conveniently generated by implementing a PID regulator, while the electrical on/off command for the compressor 7 is such as to minimize the difference between the target and measured outlet air temperatures $T_{OSP}$ and $T_{OUT}$;

the second controller 36 is configured to receive the target and measured outlet air temperatures $T_{OSP}$ and $T_{OUT}$, the measured evaporator air temperature $T_{EVAP}$, the aforesaid quantities indicative of the operational status of the air conditioning system 1, as well as quantities indicative of the operational status of the internal combustion engine 3, such as engine speed, engine coolant temperature and the electrical regulation command for the flow rate regulation solenoid valve 17, which are indicative of the variation in the amount of heat in the coolant that flows through the flow rate regulation solenoid valve 17, and that, consistent with the percentage opening of the flow rate regulation solenoid valve 17, causes a change in the measured outlet air temperature $T_{OUT}$. The second controller 36 is further configured to output a pair of electrical commands, one for the flow rate regulation solenoid valve 17 and the other for the compressor 7, which are such as to cause the air conditioning system 1 to operate in an operating condition corresponding to the aforesaid intermediate temperature error range A2, where the electrical regulation command for the flow rate regulation solenoid valve 17 is such as to minimize the difference between the target and measured outlet air temperatures $T_{OSP}$ and $T_{OUT}$ and is conveniently generated by implementing a PID regulator, while the electrical on/off command signal for the compressor 7 is such as to minimize the difference between the measured outlet air temperature $T_{OUT}$ and a corrected target outlet air temperature $T_{COSP}$, where the correction of the target outlet air temperature $T_{OSP}$ is generated so as to compensate for the change in the measured outlet air temperature $T_{OUT}$, induced by the change in the internal combustion engine speed, causing a drop in the evaporator air temperature in the case of an increase in the internal combustion engine speed or a rise in the evaporator air temperature in the case of an increase in the internal combustion engine speed, based on a stored look-up table (LUT), which for example is structured so as to associate with each combination of the electrical regulation command for the flow rate regulation solenoid valve 17 and the internal combustion engine speed and coolant temperature, a corresponding correction for the target outlet air temperature $T_{OSP}$ and a corresponding correction application duration, based on which a corresponding electrical on/off command signal is generated for the compressor 7; and the third controller 37 is configured to receive the target and measured outlet air temperatures $T_{OSP}$ and $T_{OUT}$, the measured evaporator air temperature $T_{EVAP}$, as well as the aforesaid quantities indicative of the operational status of the air conditioning system 1, and output a pair of electrical commands, one for the flow rate regulation solenoid valve 17 and the other for the compressor 7, which are such as to cause the air conditioning system 1 to operate in an operating condition corresponding to the aforesaid upper temperature error range A3, where the electrical regulation command for the flow rate regulation solenoid valve 17 is generated by implementing a PID regulator and is such as to minimize the difference between the target and measured outlet air temperatures $T_{OSP}$ and $T_{OUT}$, while the electrical on/off command signal for the compressor 7 is such as to dehumidify the air in the cabin 6 of the motor vehicle 2; and a selector 38 configured to receive as the selection command from the comparator 34 and the three pairs of electrical commands for the compressor 7 and for the flow rate regulation solenoid valve 17 from the three PID controllers 35, 36 and 37, and to select and output one of the three pairs of electrical commands based on the selection command, in particular the pair of electrical commands that cause the air conditioning system 1 to operate in the operating condition corresponding to the temperature error ranges A1, A2 or A3 indicated by the selection command.

In particular, the electrical regulation commands for the flow rate regulation solenoid valve 17 and the electrical on/off commands for the compressor 7 are voltage signals and can be either analogue or digital and, in the latter case, are conveniently pulse width modulated (PWM).

Furthermore, as described in the above-mentioned patent in the name of the Applicant, the electrical on/off commands for the compressor 7 are generated based on the outcome of a comparison of the measured evaporator air temperature $T_{EVAP}$ with a on/off threshold temperature $T_T$. In particular, each electrical on/off command is such as to cause the switching on of the compressor 7 when the measured evaporator air temperature $T_{EVAP}$ rises above the on/off threshold temperature $T_T$ and the switching off when the measured evaporator air temperature $T_{EVAP}$ drops below the on/off threshold temperature $T_T$.

The on/off threshold temperature $T_T$ can be just one for both switching on and switching off the compressor 7, or can be differentiated and separated into an on threshold temperature $T_{TON}$ and an off threshold temperature $T_{TOFF}$ for the compressor 7, depending on whether or not it is intended to provide hysteresis between the switching on and switching off of the compressor 7, and is a function of the set cabin air temperature $T_{CSP}$ according to laws that differ depending on whether the air conditioning system 1 is manually or automatically controlled.

In particular, in a manually controlled air conditioning system 1 the on/off threshold temperature $T_T$ is increased, conveniently linearly, as the set cabin air temperature $T_{CSP}$ increases within a first range of values corresponding to a cabin air cooling, and then decreased, conveniently linearly, as the set cabin air temperature $T_{CSP}$ increases within a second range of values corresponding to a cabin air heating.

Instead, in an automatically controlled air conditioning system 1, the on/off threshold temperature $T_T$ is varied inversely proportionally with respect to the difference between the measured outlet air temperature $T_{OUT}$ and the set cabin air temperature $T_{CSP}$, so as to rise as the aforesaid difference drops. In addition, the on/off threshold temperature $T_T$ is downwardly floored to a constant lower floor temperature, for example 3° C., so as to prevent the evaporator 10 from freezing, and upwardly floored to an upper floor temperature conveniently computed based on a stored look-up table (LUT), which is a database structured so as to associate with each value of the measured external air temperature $T_{EXT}$ a corresponding upper floor temperature, so as to ensure that the air downstream of the evaporator 10 has a humidity degree lower than a threshold degree.

FIG. 4 shows, by way of non-limitative example, a functional block diagram of a different embodiment of the actuator manager 32.

According to that shown in FIG. 4, the actuator manager 32 comprises the following functional blocks:

- a first controller 40 dedicated to the generation of the electrical regulation command for the flow rate regulation solenoid valve 17, which controller is configured to receive the target and measured outlet air temperatures $T_{OSP}$ and $T_{OUT}$, and output an electrical regulation command for the flow rate regulation solenoid valve 17 by conveniently implementing a PID regulator and is such as to cause the flow rate regulation solenoid valve 17 to heat the air downstream of the evaporator 10 to a degree that minimizes the difference between the target and measured outlet air temperatures $T_{OSP}$ and $T_{OUT}$;
- a first subtractor 41 configured to receive the set cabin air temperature $T_{CSP}$ and the measured external air temperature $T_{EXT}$, and output an air temperature error based on the difference between the set cabin air temperature $T_{CSP}$ and the measured external air temperature $T_{EXT}$;
- a second subtractor 42 configured to receive the target and measured outlet air temperatures $T_{OSP}$ and $T_{OUT}$ and output an outlet air temperature error based on the difference between the target and measured outlet air temperatures $T_{OSP}$ and $T_{OUT}$;
- a comparator 43 configured to receive the air temperature error from the first subtractor 41 and compare it with two thresholds, respectively lower TH1 and upper TH2 ones, which define three different air temperature error ranges, respectively lower, intermediate and upper ones, to which three different operating conditions of the air conditioning system 1 correspond, which are described in greater detail further on and where the lower air temperature error range A1 is delimited above by the lower threshold TH1, the intermediate air temperature error range A2 is delimited below by the lower threshold TH1 and above by the upper threshold TH2, and the upper air temperature error range A3 is delimited below by the upper threshold TH2. The comparator 43 is further configured to output a selection command indicative of the air temperature error range to which the input air temperature error belongs;
- a stored look-up table 44 (LUT), which is configured to receive the outlet air temperature error from the second subtractor 42, the above-mentioned quantities indicative of the operational status of the internal combustion engine 3, the electrical regulation command for the flow rate regulation solenoid valve 17 from the first controller 40 and the selection command from the comparator 43, and output a corresponding correction for the target outlet air temperature $T_{OSP}$ and an associated correction application duration;
- a third subtractor 45 configured to receive the target outlet air temperature $T_{OSP}$ and the correction for the target outlet air temperature $T_{OSP}$, and output a corrected target outlet air temperature $T_{COSP}$; and
- a second controller 46 dedicated to the generation of the electrical on/off command signal for the compressor 7, which controller is configured to receive the corrected target outlet air temperature $T_{COSP}$ and the measured outlet air temperature $T_{OUT}$, as well as the measured evaporator air temperature $T_{EVAP}$, the measured external air temperature $T_{EXT}$ and the above-mentioned quantities indicative of the operational status of the air conditioning system 1, and output an electrical on/off command signal for the compressor 7 such as to minimize the difference between the target and measured outlet air temperatures $T_{OSP}$ and $T_{OUT}$ and appropriately compensate for the variation in the measured outlet air temperature $T_{OUT}$ induced by the change in the internal combustion engine speed, for example by causing the measured evaporator air temperature $T_{EVAP}$ either to decrease in the case of an increase in the internal combustion engine speed or to increase in case of a drop in the internal combustion engine speed.

Figure 5:
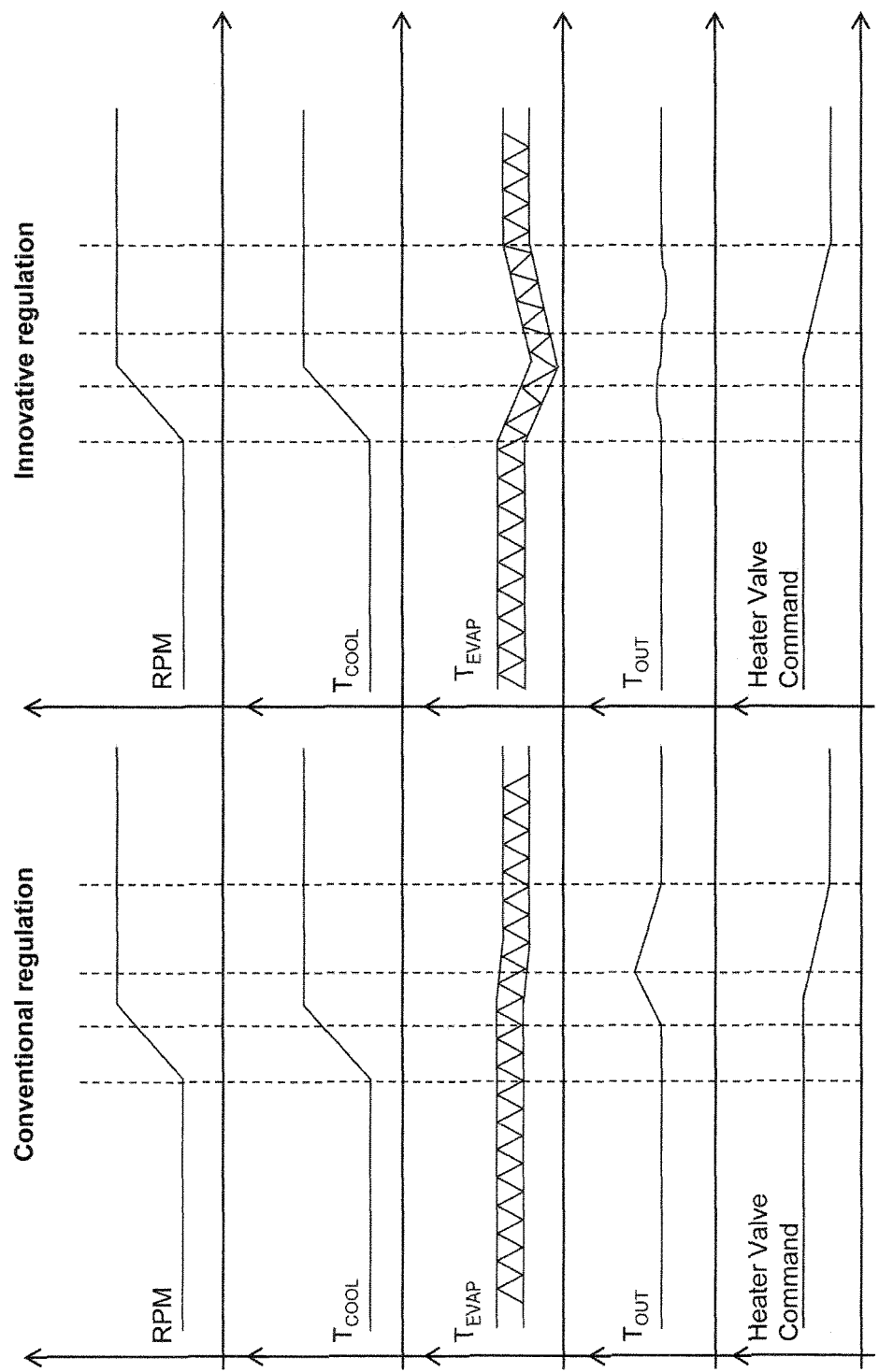
FIG. 5 shows time developments of quantities of the automotive air conditioning system shown in FIG. 1.

FIG. 5 shows two sets of graphs that represent the time developments of some quantities of the air conditioning system 1, in particular the internal combustion engine speed and coolant temperature $T_{COOL}$, the measured evaporator air temperature $T_{EVAP}$, the measured outlet air temperature $T_{OUT}$ and the electrical regulation command for the flow rate regulation solenoid valve 17, the comparison of which allows the evident benefits that implementation of the present invention renders achievable (graphs on the right) to be appreciated with respect to the case where the present invention is not applied (graphs on the left).

In particular, with reference to the functional block diagrams in FIGS. 2 and 4, in the case where the present invention is not applied, subsequent to an increase in the internal combustion engine speed, the internal combustion engine coolant flow and temperature increase and the flow rate regulation solenoid valve 17 is open and this results in the measured outlet air temperature $T_{OUT}$ increasing. Consequent upon this increase, the PID regulator 40 that generates the electrical regulation command for the flow rate regulation solenoid valve 17 causes a new set point to be set, slightly closing the flow rate regulation solenoid valve 17 so as to again minimize the difference between the target and measured outlet air temperatures $T_{OSP}$ and $T_{OUT}$. The previously described process can also affect the regulation of the compressor 7 when the change in the internal combustion engine speed is such as to cause, in addition to the variation in the measured outlet air temperature $T_{OUT}$, a variation in the measured cabin air temperature $T_{CAB}$ as well. In this case, the PID regulator 30 and the decider 31 causes a lower target outlet air temperature $T_{OSP}$ to be computed and, as a consequence, the compressor 7 is controlled to minimize the difference between the target and measured outlet air temperatures $T_{OSP}$ and $T_{OUT}$.

Instead, in the case where the present invention is applied, subsequent to an increase in the internal combustion engine speed, the internal combustion engine coolant flow and temperature increase, the look-up table 44 outputs a corresponding correction for the target outlet air temperature $T_{OSP}$ and a corresponding correction application duration, so as to cause the evaporator air temperature $T_{EVAP}$ to decrease to a value consistent with the estimate of the variation in outlet air temperature $T_{OUT}$ induced by the change in the internal combustion engine speed, such that the measured outlet air temperature $T_{OUT}$ is not affected by the change in the internal combustion engine speed. When the internal combustion engine speed 3 stops changing, correction of the target outlet air temperature $T_{OSP}$ tends to die out, returning the correct target outlet air temperature $T_{COSP}$ to the target outlet air temperature $T_{OSP}$ output by the decider 31, in a period of time in which the flow rate regulation solenoid valve 17 is able to compensate for the variation in the evaporator air temperature $T_{EVAP}$ such that the measured outlet air temperature $T_{OUT}$ is not altered.

The advantages that can be achieved with the present invention are immediately appreciable from the previous description.

In particular, by allowing the undesired effects of the internal combustion engine coolant flow rate variations on the cabin air temperature to be mitigated through opportune control over operation of the air cooling circuit's compressor, the present invention enables flow rate regulation solenoid valves with lower performance, in terms of response speed and precision, and consequently less expensive, to be used for the internal combustion engine coolant flow control, thereby resulting in the costs of the air conditioning systems being sufficiently reduced to enable their use even on economy to mid-range motor vehicles.

The invention claimed is:

1. An automotive air conditioning system comprising:
an air cooling circuit including a compressor, a condenser, an expansion valve and an evaporator, fluidically connected to be flowed through, during operation, by a first heat transfer fluid, and a blower fan associated with the evaporator and operable to generate an airflow through the evaporator;
an air heating circuit including a heater configured to be flowed through, during operation, by a second heat transfer fluid, and arranged close to the evaporator to be also flowed through by the airflow generated by the blower fan associated with the evaporator, and a flow rate regulation solenoid valve arranged to regulate the flow rate of the second heat transfer fluid through the heater; and
an electronic control unit configured to receive a measured evaporator air temperature and a set cabin air temperature and to switch an operating condition of the compressor when the measured evaporator air temperature is higher or lower than at least one on/off threshold temperature computed based on the set cabin air temperature, wherein the electronic control unit is further configured to:
receive a measured cabin air temperature, a measured external air temperature and a measured outlet air temperature;
compute a cabin air temperature error based on the set and measured cabin air temperatures;
generate a control signal based on the cabin air temperature error by implementing a proportional-integral-derivative regulator;
compute a target outlet air temperature based on the control signal;
compute a first air temperature error based on the set cabin air temperature and the measured external air temperature;
compute a second air temperature error based on the target and measured outlet air temperatures;
compare the first air temperature error with two thresholds, respectively lower and upper thresholds, which define three different air temperature error ranges to which three different operating conditions of the air conditioning system correspond, and generate, based on the outcome of the comparison, a selection command indicative of the air temperature error range to which the first air temperature error belongs;
compute a correction for the target outlet air temperature based on the second air temperature error, quantities indicative of the operational status of an internal combustion engine of a motor vehicle equipped with the air conditioning system, and the selection command;
compute a corrected target outlet air temperature based on the target outlet air temperature and the correction computed therefor;
generate an on/off command signal for the compressor of the air cooling circuit and a regulating command for the flow rate regulation solenoid valve of the air heating circuit based on the set cabin air temperature, the corrected target outlet air temperature and the measured outlet air temperature, the measured external air temperature and the measured evaporator air temperature, so as to minimize the difference between the target and measured outlet air temperatures.

2. The automotive air conditioning system of claim 1, wherein the electronic control unit is further configured to:
generate the regulating command for the flow rate regulation solenoid valve of the air heating circuit based on the target and measured outlet air temperatures and by implementing a proportional-integral-derivative regulator so as to heat the air downstream of the evaporator to such an extent that the difference between the target and measured outlet air temperatures is minimized.

3. The automotive air conditioning system of claim 1, wherein the electronic control unit is further configured to:
generate a command for the blower fan associated with the evaporator of the air cooling circuit based on the control signal, so as to cause an airflow to be generated inside a cabin of the motor vehicle such as to allow the set cabin air temperature to be reached.

4. The automotive air conditioning system of claim 1, wherein the electronic control unit is further configured to:
in a manually-controlled air conditioning system, linearly increase the on/off threshold temperature, as the set cabin air temperature increases in a first range of values corresponding to a cabin air cooling, and linearly decrease the on/off threshold temperature, as the set cabin air temperature increases in a second range of values corresponding to a cabin air heating; and in an automatically-controlled air conditioning system, vary the on/off threshold temperature, inversely and proportionally to the difference between the measured outlet air temperature and the set cabin air temperature, so as to increase as the difference decreases.

5. The automotive air conditioning system of claim 4, wherein the electronic control unit is further configured to:
downwardly limit the on/off threshold temperature to a constant lower temperature limit, so as to prevent the evaporator from freezing; and
upwardly limit the on/off threshold temperature to an upper temperature ceiling computed based on the measured external air temperature, so as to cause the air downstream of the evaporator to have a humidity degree lower than a predetermined threshold.

6. The automotive air conditioning system of claim 1, further comprising an electronic control system comprising:
a temperature sensor to provide an electrical signal indicative of the measured external air temperature;
a temperature sensor to provide an electrical signal indicative of the measured evaporator air temperature;
a temperature sensor to provide an electrical signal indicative of the measured cabin air temperature;
a temperature sensor to provide an electrical signal indicative of the measured outlet air temperature; and
the electronic control unit.

7. A motor vehicle comprising an air conditioning system, the air conditioning system comprising:
an air cooling circuit including a compressor, a condenser, an expansion valve and an evaporator, fluidically connected to be flowed through, during operation, by a first heat transfer fluid, and a blower fan associated with the evaporator and operable to generate an airflow through the evaporator;
an air heating circuit including a heater configured to be flowed through, during operation, by a second heat transfer fluid, and arranged close to the evaporator to be also flowed through by the airflow generated by the blower fan associated with the evaporator, and a flow rate regulation solenoid valve arranged to regulate the flow rate of the second heat transfer fluid through the heater; and
an electronic control unit configured to receive a measured evaporator air temperature and a set cabin air temperature and to switch an operating condition of the compressor when the measured evaporator air temperature is higher or lower than at least one on/off threshold temperature computed based on the set cabin air temperature, wherein the electronic control unit is further configured to:
receive a measured cabin air temperature, a measured external air temperature and a measured outlet air temperature;
compute a cabin air temperature error based on the set and measured cabin air temperatures;
generate a control signal based on the cabin air temperature error by implementing a proportional-integral-derivative regulator;
compute a target outlet air temperature based on the control signal;
compute a first air temperature error based on the set cabin air temperature and the measured external air temperature;
compute a second air temperature error based on the target and measured outlet air temperatures;
compare the first air temperature error with two thresholds, respectively lower and upper thresholds, which define three different air temperature error ranges to which three different operating conditions of the air conditioning system correspond, and generate, based on the outcome of the comparison, a selection command indicative of the air temperature error range to which the first air temperature error belongs;
compute a correction for the target outlet air temperature based on the second air temperature error, quantities indicative of the operational status of an internal combustion engine of a motor vehicle equipped with the air conditioning system, and the selection command;
compute a corrected target outlet air temperature based on the target outlet air temperature and the correction computed therefor;
generate an on/off command signal for the compressor of the air cooling circuit and a regulating command for the flow rate regulation solenoid valve of the air heating circuit based on the set cabin air temperature, the corrected target outlet air temperature and the measured outlet air temperature, the measured external air temperature and the measured evaporator air temperature, so as to minimize the difference between the target and measured outlet air temperatures.

8. An automotive electronic control system for an automotive air conditioning system according to claim 1, comprising:
a temperature sensor to provide an electrical signal indicative of the measured external air temperature;
a temperature sensor to provide an electrical signal indicative of the measured evaporator air temperature;
a temperature sensor to provide an electrical signal indicative of the measured cabin air temperature;
a temperature sensor to provide an electrical signal indicative of the measured outlet air temperature; and
the electronic control unit.

9. A non-transitory computer readable medium loadable in the automotive electronic control unit of the automotive air conditioning system according to claim 1 and designed to cause, when executed, the automotive electronic control unit to become configured to receive the measured evaporator air temperature and the set cabin air temperature and to switch the operating condition of the compressor when the measured evaporator air temperature is higher or lower than the at least one on/off threshold temperature computed, based on the set cabin air temperature.

* * * * *